(12) United States Patent
Wang et al.

(10) Patent No.: US 7,720,439 B2
(45) Date of Patent: May 18, 2010

(54) WIRELESS MEDIA DEVICE CRADLE

(75) Inventors: Ah Jee Wang, Irvine, CA (US); Scott Lambden, Anaheim, CA (US); Maggie Chen, Irvine, CA (US); Jeff Chen, Irivine, CA (US)

(73) Assignee: D-Link Systems, Inc., Fountain Valley, CA (US)

( * ) Notice: Subject to any disclaimer, the term of this patent is extended or adjusted under 35 U.S.C. 154(b) by 590 days.

(21) Appl. No.: 11/193,095

(22) Filed: Jul. 28, 2005

(65) Prior Publication Data

US 2007/0026799 A1    Feb. 1, 2007

(51) Int. Cl.
*H04B 7/00* (2006.01)

(52) U.S. Cl. .................. 455/41.2; 455/41.1; 455/556.1; 455/557

(58) Field of Classification Search ................ 455/41.2, 455/90.1, 90.3, 556.1–2, 556.2, 557, 552.1, 455/575, 575.1, 41.1
See application file for complete search history.

(56) References Cited

U.S. PATENT DOCUMENTS

| | | | |
|---|---|---|---|
| 5,790,952 A * | 8/1998 | Seazholtz et al. | 455/432.1 |
| 6,405,049 B2 * | 6/2002 | Herrod et al. | 455/517 |
| 6,657,654 B2 * | 12/2003 | Narayanaswami | 348/14.04 |
| 6,980,812 B1 * | 12/2005 | Sandhu et al. | 455/456.1 |
| 7,110,789 B1 * | 9/2006 | Curtiss et al. | 455/556.1 |
| 2003/0092377 A1 * | 5/2003 | Hill | 455/3.06 |
| 2004/0110544 A1 * | 6/2004 | Oyagi et al. | 455/575.1 |
| 2006/0286943 A1 * | 12/2006 | Vance et al. | 455/90.1 |

OTHER PUBLICATIONS

"D-Link, Building Networks for People—Wireless G Central Home Drive", 2004, 2 pages, D-Link Systems, Inc., www.dlink.com, USA.
Chan et al., "ConnectionManager: 1 Service Template Version 1.01", Jun. 25, 2002, pp. 1-25, Contributing Members of the UPnP™ Forum, USA.
John Ritchie, "MediaServer:1 Device Template Version 1.01", Jun. 25, 2005, pp. 1-12, Contributing Members of the UPnP™ Forum, USA.
"English Language Manual—Archos™ TV Cradle, For Archos™ AV400 series and PMA400 series", 10 pages, www.archos.com, USA.
Ritchie et al., "UPnP AV Architecture: 0.83 for UPnP™ Version 1.0" Jun. 12, 2002, Preliminary Design (TPD), pp. 1-22, Contributing Members of the UPnP™ Forum, USA.
"Wireless Storage for the Digital Home—A single highly-integrated Intel NPU powers D-Link's small, portable devices", 2004, 4 pages, D-Link Systems, Inc., www.dlink.com.
"Archos PMA400, Stay entertained and connected while on the go", 2 pages, www.archos.com.

(Continued)

*Primary Examiner*—CongVan Tran
(74) *Attorney, Agent, or Firm*—Berkeley Law & Technology Group, LLP (57) ABSTRACT

Disclosed are devices, systems and methods for integrating a media device with a network. A media device may be connected to a cradle device to receive updates of digital content. The cradle device may be coupled to a wireless link to receive content data and/or signals.

14 Claims, 3 Drawing Sheets

OTHER PUBLICATIONS

"Overview of UPnP* AV Architecture. A Digital Media Distribution Technology for the Home", 2003, Version 1.00, Jul. 2, 2003, Research and Development at Intel®, http://developer.intel.com.

John Ritchie, "MediaRenderer: 1 Device Template Version 1.01", Jun. 25, 2002, pp. 1-12 Contributing Members of the UPnP™ Forum, USA.

* cited by examiner

WIRELESS MEDIA DEVICE CRADLE

BACKGROUND

1. Field:

The subject matter disclosed herein relates to wireless communication systems.

2. Information:

Portable media devices such as MP3 players and the like are typically sold with cradles that connect the media devices to computing platforms. For a rechargeable media device, a cradle typically provides a DC power signal to charge a rechargeable battery disposed within the rechargeable media device. Also, a cradle is typically connected to a computing platform via a wired interface such as a Universal Serial Bus (USB) interface, Firewire interface and/or an Ethernet connection. Here, the wired interface enables downloading of content data and/or signals from the computing platform to a media device connected to a cradle for storage in a memory for presentation at a later time.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. However, these are merely examples of a storage medium and claimed subject matter is not limited in these respects.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a storage medium in combination with processing circuitry to execute such machine-readable instructions. However, these are merely examples of structures which may provide logic and claimed subject matter is not limited in this respect.

A computing platform and/or computing device may employ different types of information storage devices based, at least in part, on information storage capacity needs, access speed performance, cost, power consumption among other considerations. A "mass storage device" as referred to herein relates to one or more storage devices for storing large quantities of information. In one particular embodiment, although claimed subject matter is not limited in this respect, a computing platform may tolerate slower access speeds of a mass storage device than with other execution critical storage devices such as, for example, system memory and/or cache memory. In particular examples, a mass storage device may comprise one or more magnetic disks, magnetic tape, dense flash memory, compact disks and/or the like. However, these are merely examples of mass storage devices and claimed subject matter is not limited in these respects.

A "media device" as referred to herein relates to a device that is capable of generating environmental stimuli such as, for example, sounds and/or images in response to encoded information. For example, a media device may be capable of reproducing video images, music and/or other audio signals based, at least in part, on data which is encoded according to a predetermined encoding format. However, this is merely an example of a media device and claimed subject matter is not limited in these respects.

In one embodiment, a media device may comprise a "battery" that is capable of storing charge and providing a direct current power signal to the media device. Such a battery may comprise any one of several types of rechargeable and non-rechargeable technologies. Here, a battery may enable a media device to be portable in that the media device may be capable of functioning without being connected to an alternating current utility outlet.

According to an embodiment, a media device may be attached to a "cradle" that is capable of providing power and/or information to the media device, and or receiving information from the media device. In one particular embodiment, for example, a cradle may comprise a "socket" that is adapted to physically connect with an electrical and/or mechanical interface of a media device. Here, the media device and/or cradle may be in a "docked" state when the media device the electrical interface of the media device is electrically and/or mechanically connected to the cradle socket and may be in an "undocked" state when the media device is electrically and/or mechanically disconnected from the cradle socket.

A "wireless link" as referred to herein relates to a system to transmit information from a source node to a destination node without the use of cabling connecting the source node to the destination node. In one particular embodiment, for example, data may be transmitted in a wireless link in data packets according to a wireless communication protocol. In other embodiments, a wireless link may transmit information in radio frequency (RF) or infrared (IR) signals. However, these are merely examples of a wireless link and claimed subject matter is not limited in these respects.

"Transmissions" as referred to herein relate to energy that propagates in a medium from a source. In particular examples, although claimed subject matter is not limited in this respect, an RF transmission may be generated from an antenna through the air, an IR transmission may be generated from a laser device through an optical transmission medium and other electrical transmission may be generated through conductive metals such as copper. However, these are merely examples of how transmissions may occur in particular mediums and claimed subject matter is not limited in these respects.

A "wireless transceiver" as referred to herein relates to one or more devices capable of transmitting information in and/or receiving information from a wireless link. For example, a wireless transceiver may comprise circuitry and/or logic to modulate an RF and/or IR signal with encoded information according to a data transmission protocol. Similarly, a wireless transceiver may comprise circuitry and/or logic to demodulate an RF and/or IR signal to recover encoded information according to a data transmission protocol. However, these are merely examples of a wireless transceiver and claimed subject matter is not limited in these respects.

According to an embodiment, a device may be "activated" by placing the device in a state in which the device is capable of performing a particular function. In one particular embodiment, for example, a wireless transceiver may be activated to transmit information in a wireless link. Here, for example, a wireless transceiver may be activated by applying power to one or more circuits of the wireless transceiver. Alternatively, a wireless transceiver may be activated by being enabled to transmit and/or receive an RF and/or infrared signal. However, these are merely examples of how a device may be activated and claimed subject matter is not limited in this respect.

According to an embodiment, a device may be "deactivated" by placing the device in a state in which the device is incapable of performing a particular function. In one particular embodiment, for example, a wireless transceiver may be deactivated from transmitting information in a wireless link. Here, for example, a wireless transmitter may be deactivated by removing power from one or more circuits of the wireless transceiver. Alternatively, a wireless transceiver may be deactivated by disabling the wireless transceiver from transmitting and/or receiving an RF and/or infrared signal. However, these are merely examples of how a device may be deactivated and claimed subject matter is not limited in these respects.

According to an embodiment, an activated wireless transceiver may "initiate" a wireless link by transmitting a signal to and/or receiving a signal from a node. Similarly, deactivating a wireless transceiver may, as a consequence, "terminate" a wireless link since the transceiver may no longer transmit signals to and/or receive signals from a node coupled to the wireless transceiver by the wireless link. However, these are merely examples of how a wireless link may be initiated and terminated, and claimed subject matter is not limited in these respects.

A "content signal" or "content data" as referred to herein relates to a signal and/or data comprising information that is representative of environmental stimuli such as sounds and/or visual images. Here, the terms "content signal" and "content data" shall be used interchangeably throughout. In one particular embodiment, for example, a content signal may comprise signals which are encoded according to a predetermined format. Here, for example, a content signal may comprise encoded signals that are representative of audio, video, text and/or still images. However, these are merely examples of a content signal and claimed subject matter is not limited in these respects.

According to an embodiment, a media device may be capable of providing a presentation in response to and/or based on, at least in part, a content signal. In a particular embodiment, for example, a media device may be capable of displaying images and/or generating sounds which are based, at least in part, on one or more content signals.

According to an embodiment, a content signal may comprise information that is temporally defined with reference to a presentation to an audience. In a particular embodiment, for example, a content signal comprising a video component may comprise sequential frames which are temporally referenced to portions of a video presentation. In another particular embodiment, a content signal comprising an audio component may comprise sequential segments that are temporally referenced to portions of an audio presentation. However, these are merely examples of how a content signal may comprise segments which are temporally referenced to portions of a presentation and claimed subject matter is not limited in these respects.

A "server" as referred to herein relates to one or more devices and/or one or more processes on a network that manage and/or control network resources. For example, a file server may comprise a computer and storage device for storing files. Accordingly, client users may store files on and/or retrieve files from the file server by accessing the network. Similarly, a server may store content data on one or more storage devices. Here, a client user may obtain the stored content data by accessing a network that communicates with the server. In other embodiments, a server may comprise one or more software controlled processes (e.g., through execution of machine-readable instructions) enabling the storage of files and/or content data for access as illustrated above. However, these are merely examples of a server and claimed subject matter is not limited in these respects.

A "media server" as referred to herein relates to a server that is capable of providing content data to one or more clients according to a communication protocol. In one particular example, although claimed subject matter is not limited in this respect, a media server may be capable of providing digitized content data in any one of several forms including, for example, streamed content data. However, this is merely an example of a media server and claimed subject matter is not limited in this respect.

According to an embodiment, a content signal may be transmitted from a source to a destination by "streaming" the content signal whereby a first temporally referenced portion of the content signal is presented at a media device while a subsequent temporally referenced portion is being contemporaneously transmitted and/or delivered to the media device for subsequent presentation. In a particular embodiment, for example, a media device may display images of a leading portion of a streamed video signal while a trailing portion of the video signal is being transmitted and/or delivered to the media device. Similarly, a media device may generate sounds based, at least in part, on a leading portion of a streamed audio signal while a trailing portion of the audio signal is being transmitted and/or delivered to the media device. However, these are merely examples of how a content signal may be streamed to a media device and claimed subject matter is not limited in these respects.

Briefly, one embodiment relates to a media device cradle comprising a socket capable of receiving a media device, and comprising a wireless transceiver capable of transmitting information to and/or receiving information from a server through a wireless link. The media device cradle may be capable of inhibiting transmissions on said wireless link in response to an undocking of said media device from said socket. However, this is merely an example embodiment and claimed subject matter is not limited in this respect.

Figure 1:
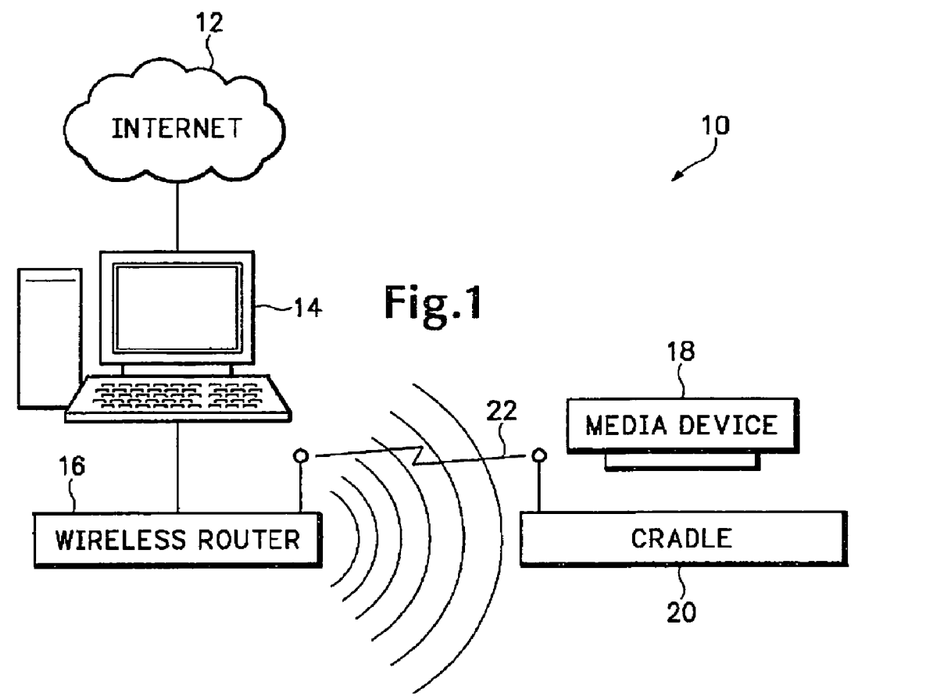
FIG. 1 is a schematic diagram of a system to transmit a content signal and/or content data to a media device over a wireless link.

FIG. 1 is a schematic diagram of a system 10 to transmit a content signal to a media device 18 over a wireless link 22. A server 14 may store content data in memory that is capable of being presented on media device 18. Such content data may comprise, for example, digitally encoded versions of musical works, photographs, movies, electronic games, live and/or recorded television broadcasts, on-line content (e.g., on-line radio and/or television broadcasts) and/or the like. However, these are merely examples of content data and claimed subject matter is not limited in this respects. In a particular embodiment illustrated in FIG. 1, server 14 may comprise a network adapter, set-top box and/or modem (not shown), or an embedded system to receive content data from one or more sources via an Internet 12 according to an Internet Protocol (IP). In other embodiments, server 14 may receive content data from other sources such as, for example, physically insertable storage media. However, these are merely examples of how a server may obtain content data for delivery and/or distribution to a media device and claimed subject matter is not limited in these respects.

According to an embodiment, server 14 may comprise a personal computer using one or more of any one of several microprocessors such as, for example, Celeron®, Pentium® and/or Itanium® microprocessors sold by Intel® Corporation, Athlon or Opteron microprocessors sold by Advanced Micro Devices, or similar microprocessors sold by Motorola. However, these are merely examples of a microprocessor that may be used in a server and claimed subject matter is not limited in these respects. The server 14 may also host an operating system such as, for example, versions of Windows® sold by Microsoft Inc. or versions of the Macintosh operating system sold by Apple Computer, or versions of the Linux operation system (e.g., for any embedded platforms). However, these are merely examples of an operating system that may be hosted on a server and claimed subject matter is not limited in these respects. Server 14 may also comprise one or more non-volatile memory devices (not shown) to store content data including, for example, one or more hard disk memory devices, optical storage media, flash memory and/or the like. However, these are merely examples of devices that may be used as non-volatile memory to store content data and claimed subject matter is not limited in these respects.

In an alternative embodiment, server 14 may comprise a dedicated network storage server such as the DSM-624H device sold by D-Link Systems, Inc. that is capable of streaming content data to devices coupled to a network. However, this is merely another example of a server that is capable of providing content data to other devices connected to a network and claimed subject matter is not limited in these respects.

According to an embodiment, server 14 may store content data in any one of digitally encoded forms such as, for example, versions of MPEG, JPEG, MP3, DivX, TIFF, WMA, WMV, AVI, Xvid, BMP, PNG, GIF and/or the like. However, these are merely examples of how content data may be stored and/or formatted according to particular embodiments and claimed subject matter is not limited in these respects.

Media device 18 may comprise any one of several media devices such as, for example, a portable music player such as an MP3 player, game platform, television, display, portable media players and/or any other type of device capable of presenting content based, at least in part, on content data and/or a content signal. However, these are merely examples of a media device and claimed subject matter is not limited in these respects.

According to an embodiment, media device 18 may be connected to a cradle 20 to receive a power signal and/or content data which is stored on server 14. Cradle 20 is capable of communicating with server 14 through a wireless link 22 coupling cradle 20 to a wireless router 16. In a particular embodiment, cradle 20 may communicate with. wireless router 16 using any one of several wireless transmission protocols such as, for example, versions of IEEE Std. 802.11, Bluetooth or Ultra-Wideband. However, these are merely examples of wireless transmission protocols that may be used for transmitting content data and claimed subject matter is not limited in these respects.

According to an embodiment, system 10 may be capable of integrating server 14, cradle 20 and/or media device 18 as elements of a Universal Plug and Play Audio Visual (UPnP AV) architecture as illustrated in UPnP AV Architecture: 0.83 for UPnP Version 1.0, UPnP Forum, Jun. 12, 2002. Here, for example, server 14 may comprise a MediaServer comprising one or more devices to provide content data such as, for example a personal computer with media server software, VCRs, DVD players, DVRs, Network Attached Storage devices, broadband receivers (e.g., for receiving satellite, cable and/or DSL transmissions), TV tuners, radio tuners, CD players, audio tape players, MP3 players and/or the like. However, these are merely examples of devices that may provide a server with content data for distribution to a media device and claimed subject matter is not limited in this respect. Media device 18 may comprise a MediaRenderer according to the aforementioned UPnP AV architecture. Here, for example, media device 18 may enable control from an external UPnP Control Point (not shown) to control aspects of a presentation of media such as, for example, brightness, contrast, volume, tone, stop, pause, seek and/or the like. However, these are merely examples of how an external UPnP control point may affect a presentation of content from a media device and claimed subject matter is not limited in these respects. Alternatively, a control interface on the media device 18 itself may enable a user to affect presentation of content from media device 18 as illustrated above.

According to an embodiment, cradle 20 may be capable of detecting when media device 18 is docked in or undocked from a socket (not shown) of cradle 20. Here, cradle 20 may activate wireless link 22 when media device 18 is connected to cradle 20 to receive content data from server 14. When media device 18 is disconnected from cradle 20, on the other hand, cradle 20 may terminate wireless link 22, thereby reducing emissions. Cradle 20 may also provide power inputs to Media Device 18 for recharging batteries disposed inside the Media Device 18.

Figure 2:
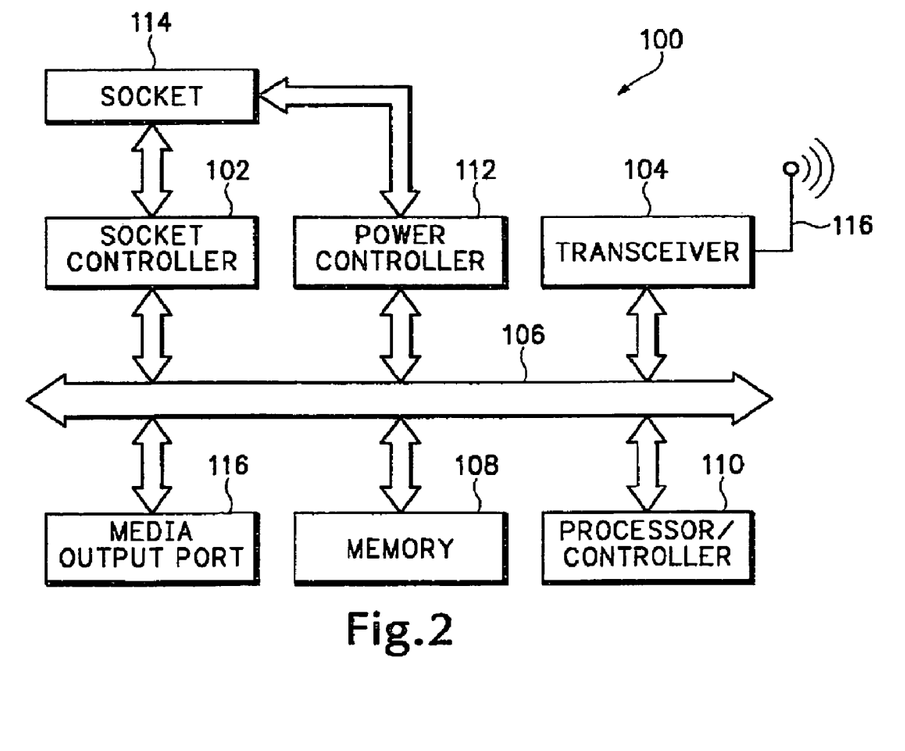
FIG. 2 is a schematic diagram of a cradle for receiving a media device according to an embodiment.

FIG. 2 is a schematic diagram of a cradle 100 for receiving a media device according to an embodiment of cradle 20 shown in FIG. 1. A socket 114 may comprise an electromechanical interface (not shown) to connect to a media device. According to a particular embodiment, for example, socket 114 may provide a direct current (DC) power signal to such a connected media device from a power controller 112 and/or content data received from a wireless link via transceiver 104. A socket controller 102 may detect a state of connection between socket 114 and a media device such as, for example, whether the media device is docked in socket 114 or undocked. Power controller 112 may, according to a particular embodiment, provide the DC power signal in response to an alternating current (AC) power source such as a utility socket (not shown).

Socket controller 102, power controller 112 and transceiver 104 may communicate with one another and with processor/controller 110 and memory 108 through bus 106. Processor/controller 110 may comprise any one of several processor and/or controller cores such as, for example, a MIPS, ARM-7 or ARM-9 processor core, or digital signal processor core. However, these are merely examples of processor cores that may be used to provide a processor/controller, and claimed subject matter is not limited in this respect. In one embodiment, transceiver 104 may employ direct memory access (DMA) techniques to store data received from a wireless communication link via antenna 116 in buffer locations of memory 108 and/or transmit data from such buffer locations through a wireless communication link. However, this is merely an example of how a transceiver may transmit data between a communications link and memory, and claimed subject matter is not limited in these respects.

Memory 108 may comprise one or more volatile and/or non-volatile memory devices such as, for example, random access memory (RAM), flash memory and/or the like. According to an embodiment, processor/controller 110 is capable of executing machine-readable instructions which are stored in addressable memory locations of memory 108. In a particular embodiment, for example, processor/controller 110 may execute machine-readable instructions to control transceiver 104 in response to detected events such as, for example, a docking and/or undocking of a media device from socket 114 and/or user inputs to a media device (not shown).

According to an embodiment, although claimed subject matter is not limited in this respect, socket controller 102 may be capable of initiating an interrupt to processor controller 110 in response to events. For example, socket controller 102 may initiate an interrupt to processor/controller 110 in response to detection that a media device is docked in socket 114 and initiate another interrupt to processor/controller 110 in response to detection that a media device is undocked from socket 114. Alternatively, socket controller 102 may initiate an interrupt to processor/controller 110 upon detection of other events and/or conditions relating to a media device docked in socket 114 such as, for example, user inputs received at a user interface of the docket media device. As described below, in response to such an interrupt, processor/controller 110 may execute machine-readable instructions comprising an interrupt service routine to, for example, activate and/or deactivate transceiver 104. However, these are merely examples of how a wireless link may be activated and/or deactivated in response to detection of events, and claimed subject matter is not limited in these respects.

Figure 3:
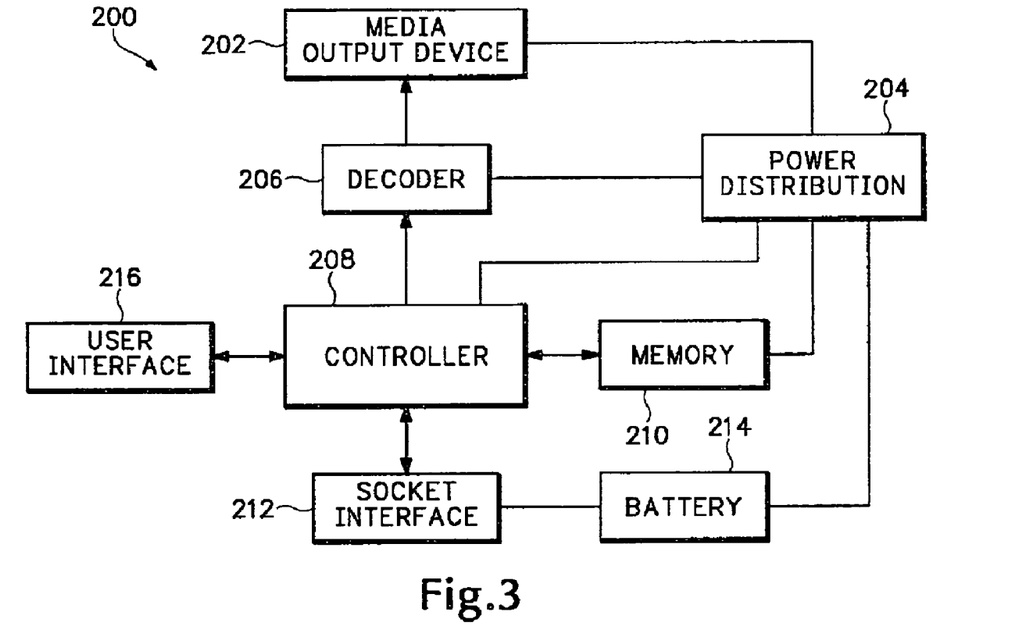
FIG. 3 is a schematic diagram of a media device according to an embodiment.

FIG. 3 is a schematic diagram of a media device 200 according to an embodiment of media device 18 shown in FIG. 1. Media device 200 may comprise a media output device 202 which may comprise one or more devices for generating environmental stimuli for presenting media based, at least in part, on content data which is decoded at a decoder 206. Such devices may comprise, for example, one or more speakers and/or display devices. In one embodiment, although claimed subject matter is not limited in these respects, controller 208 may retrieve content data from addressable locations in memory 210 where the content data may be encoded and/or compressed according to a predetermined format such as, for example, MPEG, JPEG, MP3, DivX, TIFF, WMA, WMV, AVI, Xvid, BMP, PNG and/or GIF. Decoder 206 may then decode the content data to provide one or more signals for generating a presentation on media output device 202.

In one particular embodiment, although claimed subject matter is not limited in this respect, a content signal and/or content data may be streamed from socket interface 212 to decoder 206 while media device 200 is in a docked state. Here, media output device 202 may generate a presentation based, at least in part, on a leading portion of temporally referenced content data while a trailing portion of the temporally referenced content data is still being received from cradle 100 at socket interface 212.

A socket interface 212 may electro-mechanically connect with socket 114 of cradle 100 when media device 200 is in a docked state, and electro-mechanically disconnect from socket 114 when in an undocked state. In one particular embodiment, although claimed subject matter is not limited in this respect, battery 214 may be rechargeable from a DC power signal received from cradle 100 via socket interface 212 when media device 200 is in the docked state. With a charged battery 214, a power distribution device 204 may provide power from battery 214 to portions of media device 200 regardless of whether media device 200 is docked in cradle 100. However, this is merely an example of how power may be distributed to portions of a media device and claimed subject matter is not limited in these respects.

The media device 200 may also comprise a user interface 216. In a particular embodiment, although claimed subject matter is not limited in this respect, user interface 216 may comprise buttons, dials, mechanical switches, pointing devices and/or the like for receiving user inputs. However, these are merely examples of mechanisms for receiving user inputs at a user interface and claimed subject matter is not limited in these respects. In particular embodiments, user interface 216 may receive user inputs such as, for example, power on/off, volume, mode, play, rewind, fast forward and/or the like. However, these are merely examples of user inputs that may be received at a user interface and claimed subject matter is not limited in these respects.

According to an embodiment, although claimed subject matter is not limited in this respect, memory 210 of media device 200 may comprise one or more mass storage devices (e.g., hard disk, optical memory device, dense flash device and/or the like) capable of storing content data for presentation through media output device 202. Also, according to a particular embodiment, processor/controller 110 may be capable of executing machine-readable instructions from memory 108 to provide a media server. Although claimed subject matter is not limited in this respect, such a media server may comprise a substantially compliant UPnP AV media server. While media device 200 is docked in cradle 100, according to a particular embodiment, a media server hosted on cradle 100 may enable access to content data stored on memory 210 through socket. One or more client devices (not shown) capable of communicating with cradle 100 via transceiver 104 (e.g., according to an IP protocol through router 16) may access content data stored on memory 210 of media device 200. Here, the media server hosted on cradle 100 may access memory 210 as a local mass storage for storage and retrieval of content data in response to requests from client devices (not shown) other than media device 200.

According to an embodiment, cradle 100 may comprise one or more media output ports 116 capable of providing an output signal to one or more media output devices (not shown) such as, for example, a television display, audio output devices and/or the like. Such a media output port 116 may comprise an interface capable of providing a media output signal in any one of several formats such as, for example, composite audio and video formats, S-video, component video, optical digital audio, coaxial digital audio and/or HDML. In a particular embodiment, accordingly, a media output port 116 may connect cradle 100 directly to a television for viewing images rendered from photo or video files stored in a mass storage device of memory 210 of media device 200 when media device 200 is docked in cradle 100. For example, cradle 100 may retrieve encoded media files from a mass storage device of memory 210, transcode the media files to a suitable output signal format, and transmit a resulting output signal to a media output device through a media output port 116.

Figure 4:
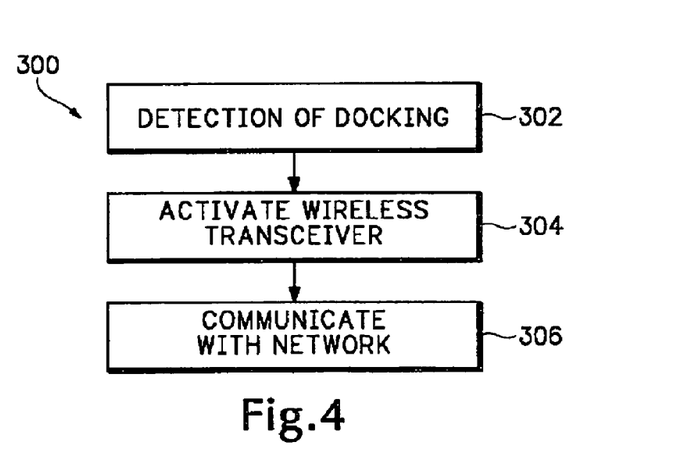
FIG. 4 is a flow diagram illustrating an embodiment of a process to initiate a wireless link in response to coupling a media device to a cradle according to an embodiment.

FIG. 4 is a flow diagram illustrating an embodiment of a process embodiment 300 to initiate a wireless link in response to coupling a media device to a cradle according to a particular embodiment of media device cradle 100. According to a particular embodiment, although claimed subject matter is not limited in this respect, process embodiment 300 may be executed, in whole or in part, by processor/controller 110 under the control of machine-readable instructions stored in memory 108. In alternative embodiments, process embodiment 300 may be executed in whole or in part by other logic in cradle 100, and claimed subject matter is not limited in this respect. In any case, these are merely examples of how a process may be executed by a cradle and claimed subject matter is not limited in these respects.

According to an embodiment, block 302 may detect that a media device (e.g., media device 200, for example) is being docked in socket 114. In one particular embodiment, for example, such a detection of a docking in a socket may occur in response to receipt of an interrupt signal generated at socket controller 102. In response to detection of the docking event, block 304 may initiate a wireless link (e.g., coupling wireless transceiver 104 with wireless router 16) by, for example, activating transceiver 104 at block 304. In one embodiment, although claimed subject matter is not limited in this respect, cradle 100 may commence transmitting a power signal through socket 114 in response to detection that a media device docked in socket 114. Transmission of such a power signal through socket 114 may enable recharging of a battery in the docket media device. Also, in a particular embodiment, in response to detection of the docking event processor/controller 110 may apply power to one or more circuits of transceiver 104, enabling transceiver 104 to transmit signals to and/or receive signals from wireless router 16 according to one of the aforementioned wireless transmission protocols. Processor/controller 110 may also perform additional tasks to establish a wireless link with wireless router 116 such as, for example, performing protocol specific processing to initiate and maintain the wireless link.

Following activation of a wireless transceiver and initiation of a wireless link at block 304, process 300 may communicate with elements of system 10 such as server 14 at block 306. Here, in a particular embodiment for example, block 306 may announce to elements of system 10 as to the existence of cradle 20 and/or media device 18 as a UPnP entity, and/or initiate UPnP discovery requests to elements of system 10. Similarly, in another particular embodiment, block 306 may respond to UPnP discovery requests from elements of system 10 such as server 14. In another particular embodiment, server 14 may establish itself as a UPnP AV MediaServer and media device 18 may (via cradle 20, for example) establish itself as a UPnP AV MediaRenderer. Accordingly, media device 18 may then receive content data from server 14 via the established wireless link. It should be understood, however, that these are merely examples of how a media device docked in a cradle may communicate with elements of a network through a wireless link and claimed subject matter is not limited in these respects.

According to an embodiment, at block 306 server 14 may wirelessly stream content data to media device 18 via wireless link 22. With server 14 acting substantially as a UPnP AV MediaServer and media device 18 acting substantially as a UPnP MediaRenderer, media device 18 may request from server 14 a streamed content signal such as, for example, music, photos, video, television and/or radio broadcast and/or the like. Here, for example, media device 18 may communicate with server 14 over wireless link 22 to locate and/or select specific content which is stored on server 14. In response to a request from the media device 18 for the streaming of selected content, server may transmit the selected content over the wireless link 22 in a streamed fashion. However, this is merely an example of content data may be wirelessly streamed to a media device which is docket in a cradle and claimed subject matter is not limited in this respect.

According to an embodiment, block 306 may comprise one or more processes for synchronization of content data stored in server 14 and media device 18. For example, media device 18 and server 14 may exchange key information including, for example, filenames, file sizes, dates and times files were created and/or last updated, file version numbers and/or the like. This key information may be exchanged in any one of several suitable metadata formats such as, for example, eXtensible markup language (XML) documents according to any one of several suitable protocols such as HTTP and/or proprietary protocols. Based, at least in part, on the key information server 14 may transmit updated files to media device 18 according to an update process. According to a particular embodiment, although claimed subject matter is not limited in this respect, files to be synchronized may be identified at either server 14 or device 18. This may effectively limit the synchronization process to particular files of interest to avoid excessive data transmissions between server 14 and device 18 and/or cradle 20. According to an embodiment, such a synchronization of content data may be enabled and/or disabled from a user interface of cradle 20 and/or device 18.

Figure 5:
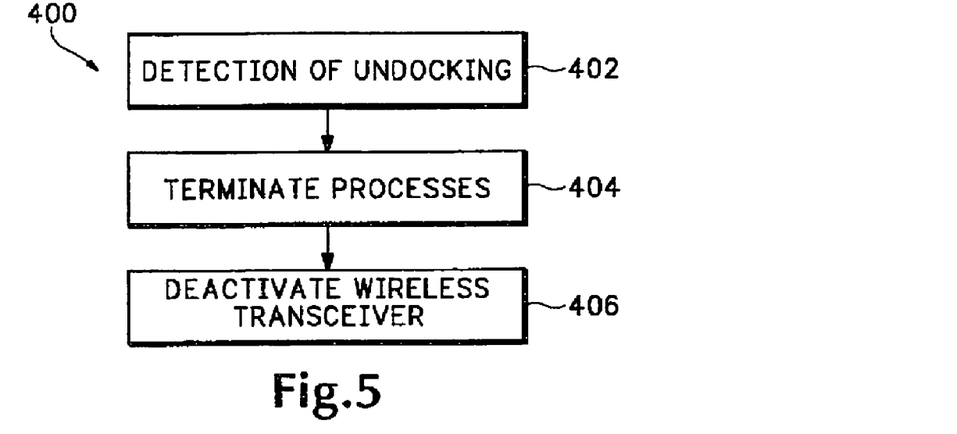
FIG. 5 is a flow diagram illustrating an embodiment of a process to terminate a wireless link in response to undocking a media device from a cradle according to an embodiment.

FIG. 5 is a flow diagram illustrating of a process embodiment 400 to terminate a wireless link in response to undocking a media device from a cradle according to a particular embodiment of media device cradle 100. An undocking of a media device from a cradle may be detected at block 402. Here, such an undocking may be a result of mechanically and/or electrically disconnecting a media device from electrical terminals and/or mechanically couplings of a media device cradle. However, this is merely an example of how a media device may be undocked from a media device cradle and claimed subject matter is not limited in these respects. A socket controller (e.g., socket controller 102) may detect such a mechanical and/or electrical disconnection and initiate an interrupt signal (e.g., to processor/controller 110) in response. However, this is merely an example of how an undocking of a media device from a media device cradle may be detected and claimed subject matter is not limited in these respects.

In response to detection of an undocking of a media device from a media device cradle at block 402, process 400 may terminate processes that communicate with other elements of system 10 including, for example, announcing to the other elements of system 10 that a media device and/or media device cradle is suspending communication. At block 406, process 400 may then deactivate a wireless transceiver (e.g., wireless transceiver 104) to terminate a wireless link. Here, for example, process 400 may remove power from one or more circuits the transceiver, and/or disable the transceiver from transmitting signals and/or receiving signals according to one of the aforementioned wireless transmission protocols. However,. these are merely examples of how a wireless transceiver may be deactivated to reduce RF transmissions and claimed subject matter is not limited in these respects.

According to an embodiment, FIGS. 4 and 5 illustrate process embodiments for initiating and/or terminating a wireless link between a media device cradle 100 and a server and/or wireless router based, at least in part, on whether a media device is docked in or undocked from the media device cradle 100. In an alternative embodiment, although claimed subject matter is not limited in this respect, cradle 100 may activate and/or deactivate transceiver 104 in response to inputs from a user interface of a media device (e.g., user interface 216 of media device 200) docked in cradle 100. In one particular example, although claimed subject matter is not limited in this respect, wireless transceiver 104 of cradle 100 may be activated and/or deactivated in response to a user input to user interface 216 of media device 200.

Figure 6:
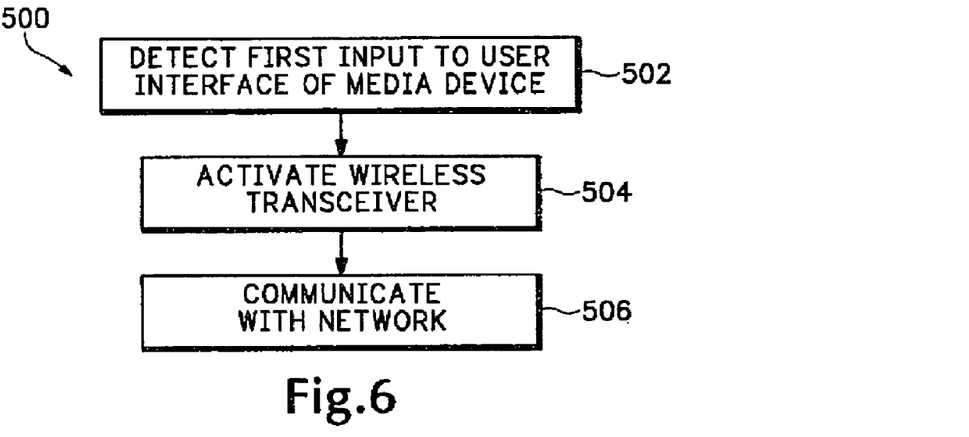
FIGS. 6 and 7 are flow diagrams illustrating process embodiments to activate and/or deactivate a wireless transceiver of a media device cradle in response to user inputs received at a user interface of a media device.
Figure 7:
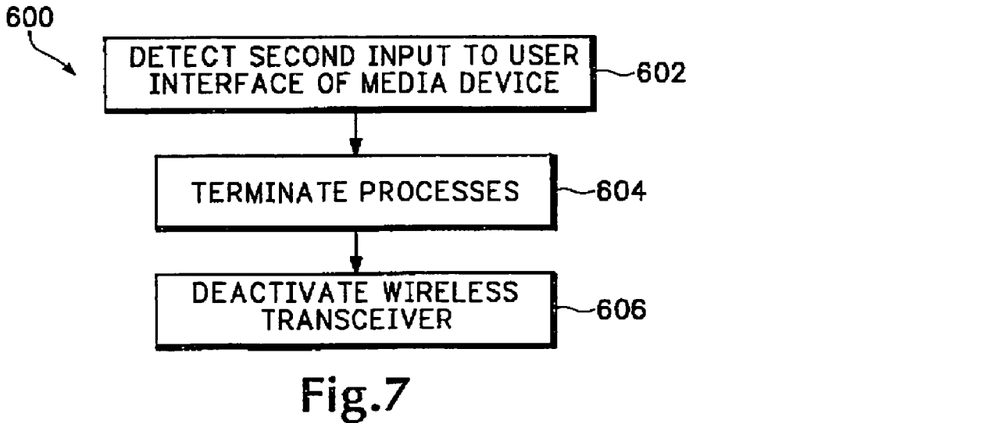

FIGS. 6 and 7 are flow diagrams illustrating process embodiments 500 and 600 to activate and/or deactivate a wireless transceiver of a media device cradle in response to user inputs received at a user interface of a media device. Referring to particular embodiments of media device cradle 100 of FIG. 2 and media device 200 of FIG. 3, at block 502 media device 200 may be docked in media device cradle 200 while media device cradle detects a first user input to user interface 216 at socket 114. Such a first user input may comprise, for example, an input to power on media device 200. However, this is merely an example of a user input to a media device that may be detected by a media device cradle while the media device is docked and claimed subject matter is not limited in this respect. Here, processor/controller 110 may detect this user input via socket controller 102 as illustrated above with reference to block 302 of process embodiment 300. In response to such a detection of a user input at block 502, the media device cradle 100 may activate transceiver 104 at block 504 to initiate a wireless link with wireless router 16, and communicate with the network at block 506 as described above with reference to blocks 304 and 306, respectively, of process embodiment 300. Media device cradle 100 may initiate other processes in response to detection of a user input at block 502 such as, for example, initiating recharging of batteries in the media device 200 by applying a power signal to socket 114. However, these are merely examples of processes that a media device cradle may initiate in response to detection of a user input at a media device and claimed subject matter is not limited in these respects.

Turning to process embodiment 600, media device 200 may be docket in media device cradle 200 while device cradle 200 is communicating via a wireless link. In an alternative embodiment, although claimed subject matter is not limited in this respect, media device 100 may be undocked from cradle 100 but communicate with cradle 100 with a second wireless link. At block 602, media device cradle 100 may detect a second input at user interface of media device 200, through, for example, socket controller 102. Such a second user input may comprise, for example, an input to power off media device 200. However, this is merely an example of a user input to a media device that may be detected by a media device cradle and claimed subject matter is not limited in this respect. Here, processor/controller 110 may detect this second user input via socket controller 102 as illustrated above with reference to block 402 of process embodiment 400. In response to such a detection of a second user input at block 602, the media device cradle 100 may terminate processes communicating over the wireless link at block 604. Media device cradle 100 may then deactivate transceiver 104 at block 606 to terminate a wireless link with wireless router 16 as described above with reference to blocks 404 and 406, respectively, of process embodiment 400. In another embodiment, media device cradle may terminate recharging of a media device upon detection of an input at block 602. However, these are merely examples of actions that may be initiated in response to a detection of an input at block 602 and claimed subject matter is not limited in this respect.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A system comprising:
    a media device;
    a cradle capable of receiving said media device and comprising a wireless transceiver to communicate a content signal comprising media via a wireless link between said cradle and a device in response to a reguest from said device; and
    a server capable of initiating transmission of said streamed content signal through said wireless link based, at least in part, upon data in a memory which is accessible by said server;
    wherein said cradle is capable of inhibiting transmissions on said wireless link in response to at least one of a user input received at said media device and/or an undocking of said media device from said cradle, and
    said media device is capable of presenting said media at a media output device in response to said content signal being received by said cradle over said wireless link.

2. A system comprising:
    a media device comprising one or more mass storage devices to store content data; and
    a cradle capable of receiving said media device and comprising a wireless transceiver to communicate a content signal comprising media via a wireless link between said cradle and a device in response to a reguest from said device,
    wherein said cradle is capable of inhibiting transmissions on said wireless link in response to at least one of a user input received at said media device and/or an undocking of said media device from said cradle, said cradle further comprising
logic to retrieve content data from said one or more mass storage devices when said media device is in a docket state; and
one or more media output ports capable of transmitting signals to media output devices based, at least in part, on said retrieved content data.

3. The system of claim 2, wherein said cradle further comprises logic to transcode said retrieved content data to render said retrieved content data on one or more media output devices through said one or more media ports.

4. A media device cradle comprising:
a socket capable of receiving a media device; and
a wireless transceiver capable of transmitting, to a device, a content signal comprising media and/or receiving a content signal comprising pre-selected media from a wireless link, said transmitting and/or receiving being performed in response to a request from the device;
wherein said cradle is capable of inhibiting transmissions on said wireless link in response to at least one of a user input received at said media device and/or an undocking of said media device from said cradle, and
wherein said media device further comprises:
a socket controller to initiate a first interrupt in response to said undocking of said media device from said socket and/or detection of said user input; and
a processor and/or controller to deactivate said wireless transceiver in response to said first interrupt.

5. The media device of cradle 4, wherein said cradle is further capable of initiating said wireless link in response to at least one of a user input received at said media device and/or a docking of said media device in said socket.

6. The media device cradle of claim 5, wherein said media device further comprises:
a socket controller to initiate a second interrupt in response to said docking of said media device from said socket and/or detection of said user input; and
a processor and/or controller to activate said wireless transceiver in response to said second interrupt.

7. A method comprising:
docking a media device to a socket of a media device cradle;
initiating a wireless link coupling said media device cradle to a server in response to said docking of said media device to transmit a content signal comprising pre-selected media between said media device cradle and said server in response to a request from a device;
wherein said media device further comprises one or more mass storage device to store content data, and wherein said method further comprises synchronizing at least a portion of said content data with said server.

8. A method comprising:
hosting a media server on a media device cradle capable of receiving a media device;
docking said media device into a socket of said media device cradle, said media device comprising one or more mass storage devices to store content data;
accessing said content data by said media server in response to client requests; and
initiating a wireless link coupling said media device cradle to a remote server in response to said docking of said media device to transmit a content signal comprising pre-selected media between said media device cradle and said remote server in response to a request from a device.

9. An article comprising:
a machine-readable storage medium comprising machine-readable instructions stored thereon which, if executed by a computing device, are adapted to enable said computing device to:
inhibit transmissions of a wireless link for transmitting a content signal comprising requested media between said media device cradle and a server in response to said undocking of said media device from said media device cradle; and
initiate said wireless link between said media device cradle and said server in response to a docking of said media device in a socket of said media device cradle.

10. An article comprising:
a machine-readable storage medium comprising machine-readable instructions stored thereon which, if executed by a computing device, are adapted to enable said computing device to:
inhibit transmissions of a wireless link for transmitting a content signal comprising requested media between a media device cradle and a server in response to a first user input to a media device docked in said media device cradle; and
initiate said wireless link between said media device cradle and said server in response to a second user input to said media device.

11. An article comprising:
a machine-readable storage medium comprising machine-readable instructions stored thereon which, if executed by a computing device, are adapted to enable said computing device to:
inhibit transmissions of a wireless link for transmitting a content signal comprising requested media between a media device cradle and a server in response to a user input to a media device docked in said media device cradle; and
activate a wireless transceiver in response to said user input.

12. An article comprising:
a machine-readable storage medium comprising machine-readable instructions stored thereon which, if executed by a computing device, are adapted to enable said computing device to:
inhibit transmissions of a wireless link for transmitting a content signal comprising requested media between a media device cradle and a server in response to a first user input to a media device docked in said media device cradle; and
initiate said wireless link between said media device cradle and said server in response to a second user input to said media device.

13. A method comprising:
docking a media device to a socket of a device cradle, said media device being detachable from said device cradle and comprising one or more mass storage devices to store media content;
establishing communication between said device cradle and a remote server over a wireless link; and
synchronizing at least a portion of said requested media content with said remote server, wherein said synchronizing further comprises synchronizing selected files of said requested media content based, at least in part, on one or more predefined preferences.

14. A method comprising:

docking a media device to a socket of a device cradle, said media device being detachable from said device cradle and comprising one or more mass storage devices to store media content;
establishing communication between said device cradle and a remote server over a wireless link;
synchronizing at least a portion of said requested media content with said remote server; and
transmitting metadata between said device cradle and said remote server regarding said requested media content, and wherein said synchronizing further comprises synchronizing selected files of said requested media content based, at least in part, on said metadata.

* * * * *

UNITED STATES PATENT AND TRADEMARK OFFICE
CERTIFICATE OF CORRECTION

| | | |
|---|---|---|
| PATENT NO. | : 7,720,439 B2 | Page 1 of 1 |
| APPLICATION NO. | : 11/193095 | |
| DATED | : May 18, 2010 | |
| INVENTOR(S) | : Ah Jee Wang et al. | |

It is certified that error appears in the above-identified patent and that said Letters Patent is hereby corrected as shown below:

Column 12, Line 44, "reguest" should read --request--.
Column 12, Line 64, "reguest" should read --request--.

Signed and Sealed this
Twenty-first Day of February, 2012

David J. Kappos
*Director of the United States Patent and Trademark Office*